(12) United States Patent
Lister (10) Patent No.: US 12,134,878 B1
(45) Date of Patent: Nov. 5, 2024

(54) ELECTRIC POWERTRAIN AND METHOD OF OPERATION

(71) Applicant: Caterpillar Inc., Peoria, IL (US)

(72) Inventor: Brian E. Lister, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 19 days.

(21) Appl. No.: 18/305,037

(22) Filed: Apr. 21, 2023

(51) Int. Cl.
| F16H 61/02 | (2006.01) |
| B60K 17/10 | (2006.01) |
| E02F 9/22 | (2006.01) |
| F16H 61/00 | (2006.01) |

(52) U.S. Cl.
CPC ............ *E02F 9/2296* (2013.01); *B60K 17/10* (2013.01); *E02F 9/2228* (2013.01); *F16H 61/0025* (2013.01)

(58) Field of Classification Search
CPC .................................................. F16H 61/0009
See application file for complete search history.

(56) References Cited

U.S. PATENT DOCUMENTS

| 6,390,568 B1 | 5/2002 | Tozu et al. |
| 6,533,368 B2 | 3/2003 | Nishio et al. |
| 6,913,326 B1 | 7/2005 | Ohkubo et al. |
| 8,042,887 B2 | 10/2011 | Yamamoto et al. |
| 2017/0328297 A1 | 11/2017 | Park |

FOREIGN PATENT DOCUMENTS

| DE | 19581387 B4 * | 1/2009 | ............ F16H 61/12 |
| JP | 2001-107814 A | 4/2001 | |
| JP | 2007-200654 A | 8/2007 | |

OTHER PUBLICATIONS

DE 19581387 B4 (Year: 2009).*

* cited by examiner

*Primary Examiner* — Derek D Knight
(74) *Attorney, Agent, or Firm* — Leydig, Voit & Mayer, LTD.

(57) ABSTRACT

A machine can include an electric powertrain configured for electrical power and which includes a transmission. The transmission may be operatively associated with a hydraulic system that includes a hydraulic pump and a pressure relief valve disposed between the pump and the transmission. To reduce noise generated by the pressure relief valve, operation of the pressure relief valve may be regulated according to a pump function that relates operation of the pressure relief valve with a sensed pump operation associated with the hydraulic pump.

20 Claims, 4 Drawing Sheets

FIG. 4

ELECTRIC POWERTRAIN AND METHOD OF OPERATION

TECHNICAL FIELD

This patent disclosure relates generally to an electric powertrain configured to utilize electrical power and, more specifically, to an arrangement and strategy to regulate operation of a hydraulic system associated with the electric powertrain at startup.

BACKGROUND

Machines, and in particular mobile machines such as construction or mining machines, typically have a powertrain that generates and transmits motive power or torque between a prime mover to a point of utilization such as wheels or continuous tracks for propelling the machine. Components of a powertrain may include drive shafts, transmissions, differentials, power takeoffs and other features for transmitting rotational power. Mechanical transmissions are a particularly common powertrain component that may include a plurality of gears selectively engagable in multiple gear ratios to change the angular speed of the transmitted rotational motion and inversely the associated torque or rotational power. To selectively engage and disengage the plurality of gears, the transmission may include one or more hydraulically actuated clutches operatively associated with a hydraulic system to receive and/or discharge pressurized hydraulic fluid that activates or deactivates the clutches. Moreover, because the transmission includes various gears and components that move relative to each other, the hydraulic fluid can be used to lubricate and cool those moving components.

At startup, which may be triggered by a keyswitch-on signal, the components associated with the powertrain will begin operating to transmit rotational torque. For example, an electrical pressure relief valve in the hydraulic system may be activated to control the flow of hydraulic fluid to and from the transmission as appropriate for the startup conditions, which may be characterized as minimizing or ceasing hydraulic flow to reduce fluid pressure load and fluid pressure spikes. The electrical pressure relief valve may be a solenoid operated valve that includes an electromagnetically actuated solenoid that can change the electrical pressure relief valve between a low pressure state and a high pressure state and possibly various degrees and ranges there between. In a traditional powertrain associated with internal combustion engine or similar prime mover, operation of the hydraulic system and electrical pressure relief valve occurs in accordance with the specific operating conditions and characteristics necessitated by the internal combustion engine.

Some machines, instead of using an internal combustion engine to generate power, may utilize electricity as the power source that may be provided from a battery or generator. These electrical machines may include an electric powertrain to transmit rotational motion or torque to the point of application, and the electric powertrain may include a transmission and associated hydraulic system to adjust the speed and/or torque. However, electrically powered machines and the electric powertrains therein operate under different conditions and characteristics than traditional internal combustion machines. Accordingly, the present disclosure is directed to arrangements and strategies for adapting operation of the hydraulic system associated with a transmission in an electric powertrain specifically utilizing electrical power.

SUMMARY

The disclosure describes, in one aspect, a machine configured to operate on electrical power. The machine includes an electrical power source and an electric powertrain having an electrical motor in electrical communication with the electrical power source for converting electrical power to rotational motion. The electric powertrain further includes a transmission having a transmission input operatively coupled to the electrical motor and a transmission output operatively coupled to a point of utilization. The transmission can include a plurality of engageable gears and one or more hydraulic gearshift actuators for selectively engaging the plurality of engageable gears. To supply pressurized hydraulic fluid to and from the one or more hydraulic gearshift actuators, the machine can include a hydraulic system operatively associated with the electric powertrain with a fluid reservoir accommodating hydraulic fluid a hydraulic pump for pressuring and directing hydraulic fluid from the fluid reservoir to the transmission. A pressure relief valve is disposed between the hydraulic and the one or more hydraulic gearshift actuators for adjusting hydraulic pressure within the hydraulic system. To sense pump operation, a pump sensor is operatively associated with the hydraulic pump. The machine further includes an electronic controller operatively associated with the pressure relief valve and the pump sensor. The electronic controller is programmed to regulate the pressure relief valve according to a pump function that relates the electric current directed to the pressure relief valve when the sensed pump operation is below a pump threshold.

In another aspect, the disclosure describes a method of operating an electric powertrain having a transmission and configured to utilize electrical power. The method involves receiving a keyswitch-on signal to initiate operation of the electric powertrain and thereafter sensing a sensed pump operation of a hydraulic pump in fluid communication with the transmission. If the sensed pump operation is below a pump threshold, the method regulates the electric current directed to a pressure relief valve disposed between the hydraulic pump and the transmission according to a pump function that relates the electric current to the sensed pump operation. If the sensed pump operation exceeds the pump threshold, the method regulates operation of the pressure relief valve according to a current independence function wherein the quantity of electric current is independent of the sensed pump operation.

In yet a further aspect, the disclosure describes an electric powertrain including an electrical power source and an electrical motor receiving electrical power from the power source. A transmission has a transmission input operatively coupled to an electrical motor and a transmission output operatively coupled to a point of utilization. The transmission may further include a plurality of engageable gears and one or more hydraulic gearshift actuators for selectively engaging the plurality of engageable gears. To supply pressurized hydraulic fluid to the transmission, the electric powertrain is associated with a hydraulic system that includes a fluid reservoir accommodating hydraulic fluid and a hydraulic pump for pressuring and directing hydraulic fluid from the fluid reservoir to the transmission. A pressure relief valve can be disposed between the hydraulic pump and the transmission. To sense an operating condition associated with the hydraulic pump, a pump sensor can operatively associated with the hydraulic pump. To regulate operation of the pressure relief valve, an electronic controller is included that receives the sensed pump operation from the pump sensor. The electronic controller is programmed to regulate the pressure relief valve according to a pump function that proportionally relates electric current directed to the pressure relief valve with the sensed pump operation.

DETAILED DESCRIPTION

Figure 1:
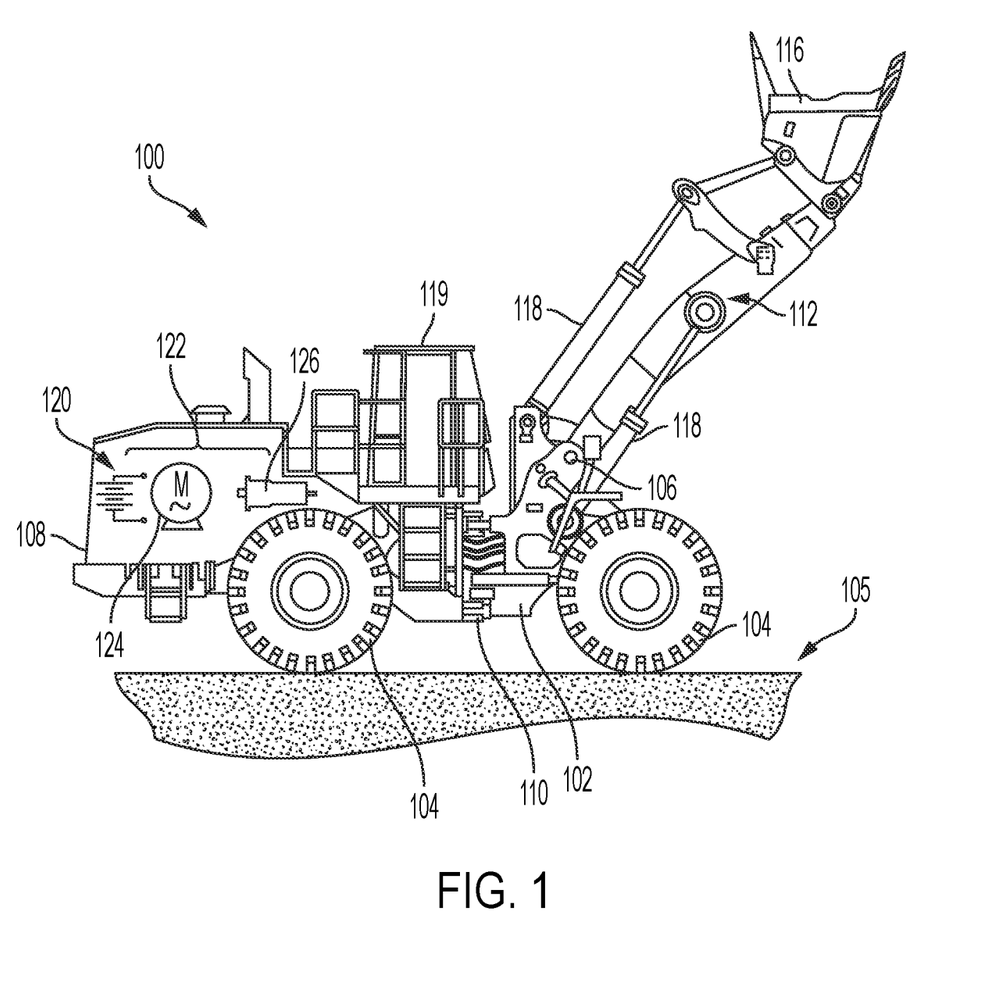
FIG. 1 is a side elevational view of a mobile machine such as a wheel loader that includes an electrically powered powertrain for transmitting power to a plurality of propulsion devices.

Referring to FIG. 1, wherein whenever possible like reference numbers will refer to like elements, there is illustrated an example of a machine 100 and, in particular, a mobile machine embodied as a wheel loader for moving or loading materials such as rock, soil, or debris. The mobile machine 100 in the embodiment of a wheel loader may include a machine frame 102 that is supported on a plurality of propulsion devices 104 that contact the ground or another work surface 105. The propulsion devices 104 can receive motive power to propel the mobile machine 100 over the work surface 105. Examples of suitable propulsion devices 104 include wheels or continuous tracks.

To change the direction of travel, the machine frame 102 may be an articulated frame including a forward frame end 106 and a rearward frame end 108 that are interconnected by an articulated joint 110 that enables the forward and rearward frame ends 106, 108 to articulate or pivot with respect to each other. Disposed on the forward frame end 106 can be a work implement such as a loading mechanism 112 that can be raised and lowered with respect to the work surface 105. The loading mechanism 112 can include one or more elongated lift arms 114 that are pivotally coupled to the forward frame end 106 at a proximal end and connected at the other distal end to a bucket 116 to accommodate material. To pivotally move the lift arms 114, the loading mechanism 112 can be operatively associated with one or more hydraulic actuators 118 such as hydraulic cylinders that can telescopically extend and retract by activation of pressurized hydraulic fluid.

To accommodate an operator, an elevated cab or operator station 119 can be supported on the rearward frame end 108 of the machine frame 102 in a position to provide visibility over the work surface 105. The operator station 119 can also accommodate various control devices and gauges for operating the mobile machine 100 such as steering wheels or joysticks, gears sticks, speedometers, and the like. In other embodiments, the mobile machine 100 can be configured for remote operation or autonomous or semi-autonomous operation. Although the machine 100 in FIG. 1 is a wheel loader, aspects of the disclosure are applicable to other types of machines that may be used in construction, mining, or agriculture such as hauling trucks, motor graders, excavators, bulldozers, and the like. Furthermore, while a mobile machine 100 is disclosed as being mobile and adapted for travel over a work surface 105 via the inclusion of a plurality of propulsion devices 104 such as wheels, aspects of the disclosure are applicable to fixed or stationary machines such as pumps, cranes, processing equipment, and the like.

To generate power for operation of the mobile machine 100 including, for example, to drive the propulsion devices 104, a prime mover that functions as the source of energy can be disposed on the rearward frame end 108. In accordance with the disclosure, the prime mover may be an electrical power source 120. The electrical power source 120 can be any suitable source of electrical energy that can provide and supply electrical power in the form of electric current and voltage to a load. The electrical power source 120 can produce electrical power as either direct current or alternating current, and the alternating electric current can be single phase or polyphase electricity. The electrical power source 120 can produce electrical power utilizing any suitable technology and operating principle including electromagnetic, thermodynamic, chemical, solar, etc.

To operatively transmit power from the electrical power source 120 to the point of utilization such as, for example, the propulsion devices 104, the electrical power source 120 may be part of an electric powertrain 122 supported on the machine frame 102. The electric powertrain 122 can include various electrical and mechanical components that transmit power in electrical and mechanical embodiments and can convert electrical power to motive power such as torque. For example, to convert electrical power to motive power, the electric powertrain 122 can include an electrical motor 124 electrically connected with the electrical power source 122. The electrical motor 124 may be an electromagnetic assembly in which the electric current is directed through conductive windings to generate a rotating magnetic field. The magnetic field can attract permanent magnets or magnetic materials disposed on a rotor causing rotation of the rotor as it follows the rotation of the magnetic field. The resulting rotational motion is output from a shaft protruding from the electrical motor 124.

To adjust the motive power output by the electrical motor 124, the electric powertrain 122 can include a transmission 126 that is operatively connected to the electrical motor. The transmission 126 may be a mechanical transmission and can include a plurality of internal engageable gears that can adjust the rotational speed input from the electrical motor 124, measured in RPMs for example, and in an inverse relation change the torque, measured in foot-pounds for example. The transmission 126 may be a fixed gear transmission with gears selectively engageable in fixed gear ratios or may be a continuously variable transmission utilizing one or more planetary gear sets. In further embodiments, the transmission may utilize components in addition to gears such as tapered pulley connected by a belt, hydrostatic components such as a hydraulic pump and an associated motor, and other suitable components.

Figure 2:
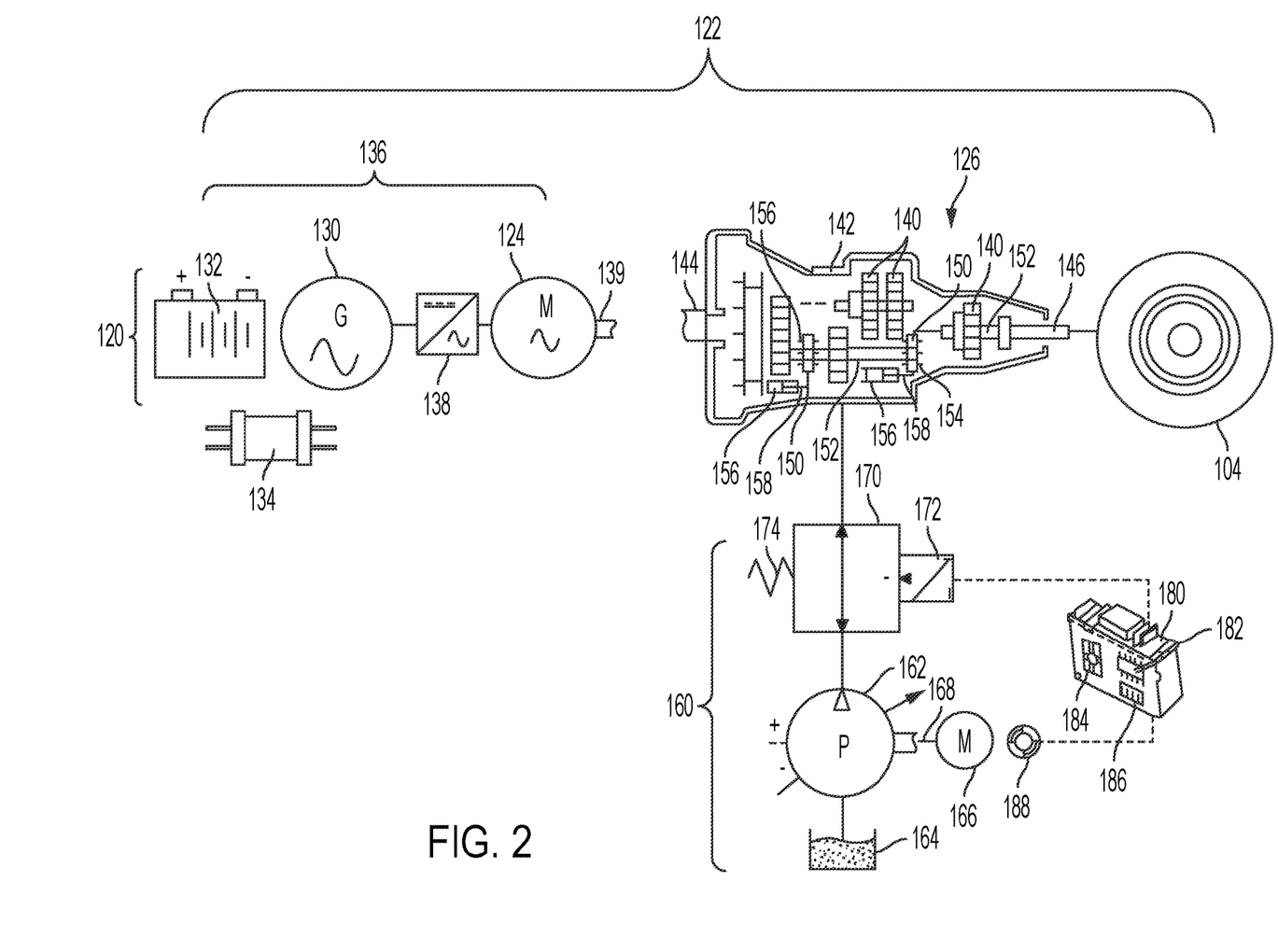
FIG. 2 is a schematic representation of the electric powertrain associated with the wheel loader in FIG. 1 which includes a transmission and an associated hydraulic system with an electrical relief valve.

Referring to FIG. 2, there is schematically illustrated a further detailed embodiment of the electrically powered powertrain 122 in operative relation with other components of the machine 100. In the present embodiment, electrical power can be generated by the electrical power source 120 that is the source of power for the electric powertrain 122. The electrical power source 120 can have any suitable design and operating principle. For example, the electrical power source 120 can be an electrical generator 130, which is similar to a motor with an electromagnetic assembly that converts motive power into electrical power in the form of alternating electric current. Specifically, the electrical generator 130 is an electromagnetic assembly in which permanent magnets or conductive field windings create a magnetic field and are rotated with respect to induction windings in which an electric current is generated. In another example, the electrical power source 120 can be a battery 132 producing direct current via an electrochemical reaction. The battery 132 can be periodically recharged from an external power source such as the electrical grid. In yet another example, the electrical power source can be a fuel cell 134 that converts a chemical energy of a fuel into electrical energy. In further examples, the electrical power source 120 can be configured as a hybrid system using energy from both electrical and mechanical sources.

The electrical power generated by the electrical power source 120 is transmitted by the conduction circuit 136 which may comprise conductive wires, power cables, and the like to different points of application. Depending upon the configuration of the electrical power source 120 and the electrical motor 124, in various embodiments, the conduction circuit 136 can include a power converter 138 that converts between alternating current and direct current so that the electrical polarity of the power transmitted by the conduction circuit 136 is matched to the electrical motor 124. The frequency of the alternating current from the power converter 138 may determine the operating speed of the electrical motor 124. The electrically powered powertrain 122 may include other electrical devices such as voltage convertors, transformers, rectifies etc. to further adjust the electrical power transmitted in the conduction circuit 136.

As stated, the electrical motor 124 converts the electrical power generated by the power source 120 to rotational motion and torque that can be output from the electrical motor by an associated motor shaft 139. The speed range of the electrical motor 124 can be a function of the characteristics of the electrical power from the electrical power source 120 and transmitted through the conduction circuit 136. Moreover, while the electrical motor 124 can be a variable speed motor, its speed range may be unmatched to that of the propulsion devices 104 of the machine 100 or another point of utilization. Accordingly, the electric powertrain 122 includes the transmission 126 to adjust the rotational speed and inversely the torque of the motive power output by the electrical motor 124.

In an embodiment, the transmission 126 may include a plurality of internal engageable gears 140 accommodated within a transmission housing 142 that can be selectively engaged and disengaged in various gear ratios thereby adjusting the rotational speed and torque output from the electrical motor 124. As will be appreciated by those of skill in the art, changing rotational speed, measured in RPMs for example, results in an inverse change in the torque, measured in foot-pounds for example. The engageable gears 140 may have different diameters and different numbers of gear teeth protruding about their diameter. The diameters and tooth number can be such that when two different engageable gears 140 are intermeshed together, they will rotate at different rotational speeds. The transmission 126 can be configured with any suitable number of predetermined or fixed gear pairings of the engageable gears 140 that represent the different speed ratios of the adjusted rotational speed between a transmission input 144 and the rotational speed at a transmission output 146. The transmission 126 can also be arranged to reverse the rotational motion to, for example, drive the machine 100 in forward or reverse. It should be noted that while the disclosed embodiment of the transmission is a mechanical transmission with discrete gear ratios, aspects of the disclosure can apply to continuously variable transmissions, hydrostatic transmissions, transmissions utilizing planetary gears, etc.

To selectively engage and disengage the plurality of engageable gears 140, the transmission 126 may include one or more clutches 150 or the like that can disconnect the transmission input 144 and the transmission output 146 and place the transmission 126 in a neutral configuration so that torque or rotational power cannot be transmitted there through. In an embodiment, the clutches 150 can be configured as disk-shaped collars concentrically disposed on the internal transmission shafts 152 of the transmission 126. The clutches 150 can axially slide with respect to the internal transmission shafts 152 and may be splined there on to rotationally lock the cutch 150 to the shaft 152. The disc-shaped clutch 150 can include mating structures 154 on each axial face that can mate with complementary structures on the engageable gears 140. When the mating structure 154 of the clutch 150 is mated with the complementary structures on the engageable gears 140, the gears will be caused to rotate with the internal transmission shafts 152.

To cause the clutches 150 to slide into and out of mating engagement with the plurality of engageable gears 140, the clutches 150 can be operatively associated with hydraulic gearshift actuators 156. The hydraulic gearshift actuators 156 may be in the embodiment of hydraulic cylinders having an internal piston slidably disposed therein and connected to piston rod 158 extending there from and telescopically protruding externally of the cylinder body. The hydraulic gearshift actuator 156 can receive pressurized hydraulic fluid that causes the piston to reciprocally move within the cylinder body causing extension and retraction of the piston rod 158. The distal end of the piston rod 158 can be connected to the clutches 150 such that reciprocation of the piston axially moves the clutches with respect to the internal transmission shafts 152.

To supply pressurized hydraulic fluid to and from the hydraulic gearshift actuators 156, the transmission 126 can be operatively associated with a hydraulic system 160. The hydraulic system 160 can have a hydraulic pump 162 and a fluid reservoir 164. The fluid reservoir 164 can be a vented or enclosed tank that accommodates the hydraulic fluid which the hydraulic pump 162 can pressurize and direct to the transmission 126 via conduits like flexible tubing or rigid pipes. The hydraulic fluid can be any suitable hydraulic fluid such as, for example, a mineral oil or a hydrocarbon-based fluid. The hydraulic pump 162 can be any suitable type of mechanical fluid pump including, for example, a gear pump that can cause pressurized flow of a fluid and can be a variable speed or fixed speed pump. In an embodiment, in addition to providing hydraulic power to the hydraulic gearshift actuators 156 in the transmission 126, the hydraulic system 160 can also function to lubricate the engageable gears 140 and other moveable components of the electric powertrain 122.

To provide a motive force to power the hydraulic pump 162, the hydraulic system 160 can be operatively associated with a pump motor 166. The pump motor 166 can be an electromagnetic assembly similar in configuration to the electrical motor 124 of the electric powertrain 122 and can convert electrical power to a rotational motive force that is transferred via a pump motor shaft 168 to actuate the hydraulic pump 162. In an embodiment, the pump motor 166 can receive electrical power from the electrical power source 120 associated with the electric powertrain 122 or may receive power from another source.

To regulate fluid pressure of the hydraulic fluid directed by the hydraulic system 160 to the transmission 126, the hydraulic system 160 can include an electrically operated pressure relief valve 170 disposed in fluid communication between the hydraulic pump 162 and the transmission 126. The pressure relief valve 170 can be configured to limit or relieve fluid pressure within the hydraulic system 160 to prevent over pressurization of the hydraulic gearshift actuators 156 within the transmission 126 and other components that receive pressurized hydraulic fluid from the hydraulic system 160. In an embodiment, the pressure relief valve 170 can also function as a trapping valve that isolates and maintains the fluid pressure within the clutches 150 in the event of a power failure or similar fault to prevent the clutches from releasing fluid pressure and unintentionally disengaging the selectively engaged engageable gears 140 of the transmission 126.

In an embodiment, the electrically operated pressure relief valve 170 can be a two-position, two-way valve that can be actuated by an electromagnetic solenoid 172 to change the position of an internal spool that may be biased against a spring 174. When the solenoid 172 is electromagnetically activated, the solenoid 172 moves or configures the spool to seal and unseal various ports disposed in the pressure relief valve 170 that are in fluid communication with the hydraulic gearshift actuators 156. The pressure relief valve 170 can also be in fluid communication with the fluid reservoir 164 to discharge and direct hydraulic fluid from the hydraulic gearshift actuators 156 directly to the fluid reservoir 164.

To regulate operation of the pressure relief valve 170 and the other aspects of the hydraulic system 160, and thus control the fluid pressure therein, the hydraulic system 160 can be operatively associated with an electronic controller 180. The electronic controller 180 can include various circuitry components in any suitable computer architecture for receiving and processing data and software. The electronic controller 180 can process and execute different functions, steps, routines, and instructions written as computer readable software programs and may use data from sources such as data tables, charts, data maps, lookup tables and the like. Additionally, the electronic controller 180 can be responsible for processing functions associated with various other systems on the electric powertrain 122. While the electronic controller 180 is illustrated as a standalone device, its functions may be distributed among a plurality of distinct and separate components.

For example, the electronic controller 180 can include one or more microprocessors 182 such as a central processing unit (CPU), an application specific integrated circuit (ASIC), or a field programmable gate array (FPGA) comprising a plurality of transistors and similar circuits that are capable of reading, manipulating and outputting data in electronic form. The electronic controller 180 can include non-transient programmable memory 184 or other data storage capabilities that may be in random access memory or more permanent non-volatile forms of data storage media. Common examples of computer-readable memory 184 include RAM, PROM, and EPROM, a FLASH-EPROM, and any other memory chips. The memory is capable of storing in software form the programming instructions and the data that can be read and processed by the microprocessor 182. The software and data may take the form of instruction sets, programs, applications, routines, libraries, databases, lookup tables, data sets, and the like. To communicate with other instruments and actuators associated with the hydraulic system 160 and the electric powertrain 122, the electronic controller 180 can include various input/output ports 186 and related circuitry. Communication may be established by sending and receiving digital or analog signals across electronic communication lines or communication busses using any suitable data communication protocols, including wireless protocols. The various communication and command channels are indicated in dashed lines for illustration purposes.

By way of example, the electronic controller 180 can be in electronic communication with one or more powertrain sensors, measurement instruments, or controls that are operatively associated with the hydraulic system 160. For example, to determine the hydraulic pressure in the hydraulic system 160, the electronic controller 180 can communicate with one or more pump sensors 188 operatively associated with the hydraulic pump 162. The pump sensors 188 can directly measure the fluid pressure of the hydraulic fluid directed by the hydraulic pump 162 to the transmission 126. In other embodiments, the pump sensor 188 can be a rotation speed sensor such as rotary encoder sensing rotational motion input to the hydraulic pump 162. The rotational pump sensor 188 is configured to sense the angular speed, i.e., the speed of rotation associated with the rotational motion, in RPM of the hydraulic pump 162. The electric controller 180 can be programmed to convert or extrapolate the operating speed of the hydraulic pump 162 into other information associated with the hydraulic system 160 such as the fluid pressure therein.

The electronic controller 180 can be operatively associated with and in electronic communication with the pressure relief valve 170 to regulate its operation. For example, the electronic controller 180 can be configured to regulate the electric current directed to the solenoid 172 and thereby control the configuration of the pressure relief valve 170 between a high pressure state and a low pressure state. In the high pressure state, the pressure relief valve 170 may freely direct pressurized hydraulic fluid from the hydraulic pump 162 to the selected hydraulic gearshift actuators 156 or other fluid receiving components of the transmission 126. In an embodiment, the pressure relief valve 170 can be configured so that, when de-energized, the pressure relief valve is in the high pressure state. This ensures that the pressure relief valve 170 does not isolate the transmission 126 and that sufficiently pressurized hydraulic fluid can be directed by the hydraulic pump 162 to the hydraulic gearshift actuators 156 engaging the clutches 150 and the engageable gears 140 of the transmission 126 in the event the solenoid 172 fails.

In an embodiment, the electronic controller 180 can be programmed to regulate operation of the hydraulic system 160 during startup of the electric powertrain 122. For example, in a conventional system at startup, a maximum quantity of electric current may be directed to energize the solenoid 172 to place the pressure relief valve 170 in a low pressure state. In the low pressure state, the energized solenoid 172 shifts the internal spools to close off select ports in the pressure relief valve 170 to reduce or prevent the hydraulic pump 162 from directing high pressure hydraulic fluid to the transmission 126. The low pressure state thus reduces the fluid pressure load in the pressure relief valve and prevents pressure spikes from occurring within the transmission at startup before the electric powertrain 122 is operating to transmit rotational power and torque to the propulsion devices 104 or other points of application. Accordingly, there is no need for the engageable gears 140 of the transmission 126 to be engaged at startup However, fully energizing the solenoid 172 with a maximum quantity of electric current causes the electromagnetic solenoid to generate and emit a buzzing or clicking noise or sound. In conventional powertrains utilizing an internal combustion engine, the sound of the engine at startup will cover up the sound generated by the solenoid when fully energized. In an electric powertrain that lacks an internal combustion engine, there is no countervailing sound to mask the noise of the solenoid, which may present or cause an uncomfortable sensation for the operator of the machine 100. In accordance with an aspect of the disclosure, the electronic controller 180 is programmed to regulate operation of the associated pressure relief valve 170 during startup to reduce or eliminate noise generated by the solenoid 172.

Figure 3:
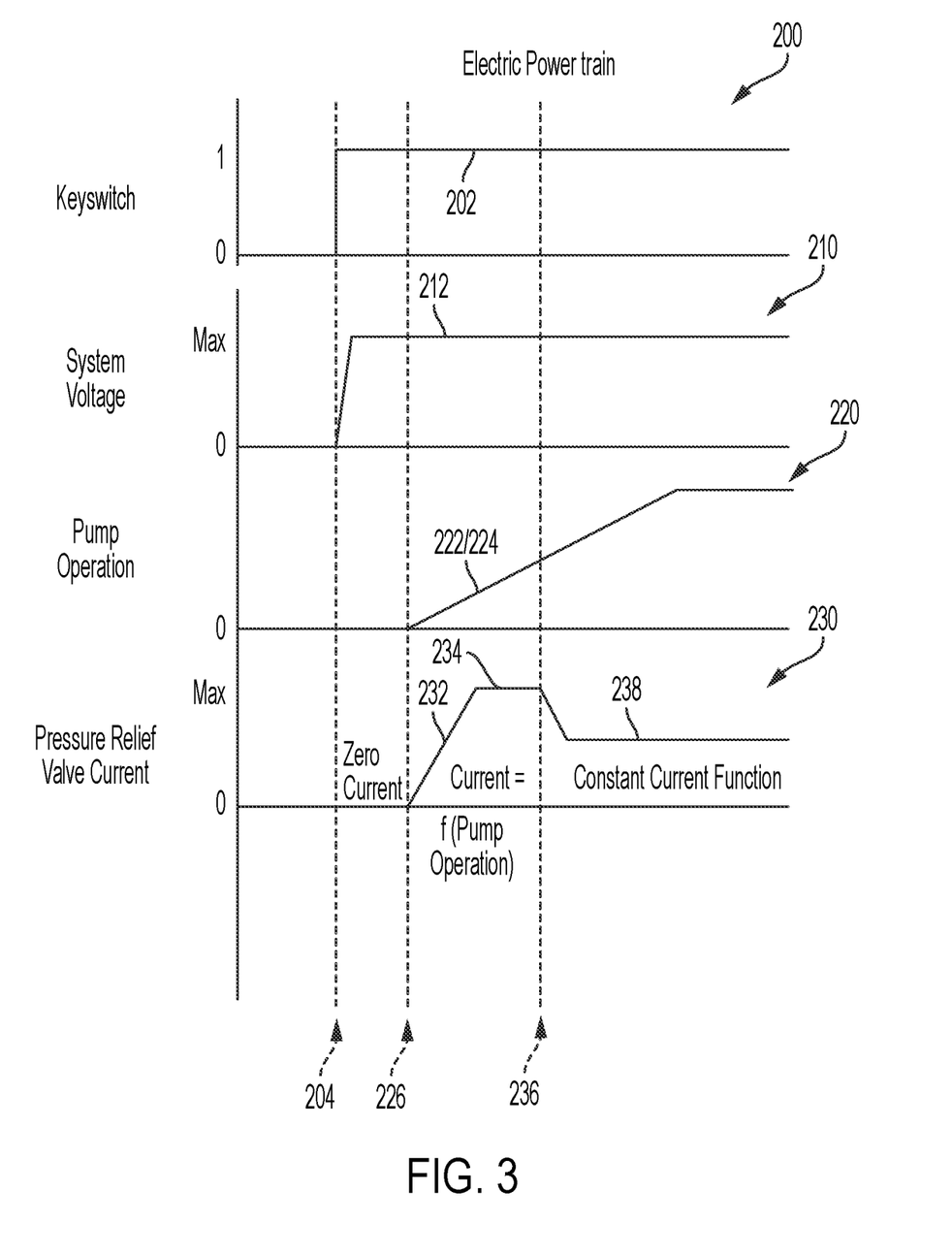
FIG. 3 is a plurality of graphs comparing different operating characteristics of the electric powertrain including the electrical pressure relief valve at startup.

Referring to FIG. 3, and with continued reference to the previous figures, there is illustrated a plurality of graphs and curves illustrating the electrical configuration of the electric powertrain 122 including the pressure relief valve 170 at startup of the electric powertrain 122. In the curves of FIG. 3, time may be represented along the X axis and the electrical performance or similar operating characteristics of the various systems may be represented along the Y axis. As indicated in the top keyswitch curve 200 of FIG. 3, startup of the electric powertrain 122 may be initiated by a "keyswitch-on" signal 202 from the operator. Startup may occur at keyswitch-on time 204 (indicated as a dashed vertical line) wherein the operator may physically turn on a keyswitch associated with the machine 100 or may conduct some similar startup routine.

Upon receiving the keyswitch-on signal 202, the electrical powertrain 122 is brought to full operating voltage with the electrical power source 120 being brought to full operating voltage, for example, by completing electrical connections between the electrical power source 120 and the conduction circuit 136. This is indicated by the system voltage curve 210 in which the system voltage 212 climbs from zero to a maximum voltage.

However, the electrical motor 124 may not be on or otherwise generating and directing motive force or torque to the transmission 126 at startup. The hydraulic pump 162 therefore is not required to direct pressurized hydraulic fluid to the transmission 126 to actuated the hydraulic gearshift actuators 156 and engage the clutches 150 and engageable gears 140 associated therewith. This is indicated by the pump curve 220 which shows the pump pressure 222 or pump motor speed 224, which may be sensed by the pump sensor 188 directly or indirectly monitoring operation of the hydraulic pump 162 and communicating with the electronic controller 180.

The electronic controller 180 can utilize the information received from the pump sensor 188 to regulates operation of the electronically operated pressure relief valve 170. For example, referring to the pressure relief valve current curve 230 in which the electronic controller 180 regulate operation of the pressure relief valve 170 in accordance with a pump function that proportionally relates the opening and closing of the pressure relief valve to the sensed operating condition of the hydraulic pump 162. If the hydraulic pump 162 is not operating or directing pressurized hydraulic fluid to the transmission 126, the electrical controller 180 may not direct or command electric current to solenoid 172 of the pressure relief valve 170 which thereby is de-energized. When de-energized, the pressure relief valve 170 remains in the opened state but, because hydraulic pump 162 is not directing pressure hydraulic fluid to the transmission 126, there is a reduced possibility of over-pressurizing the transmission or of pressure spikes occurring.

At a pump initiation time 236, occurring after the keyswitch-on time 204, the hydraulic pump 162 begins operating to pressurize and direct hydraulic fluid to the transmission 126. The electronic controller 180, at the pump initiation time 236, may continue to regulate the electric current directed to the pressure relief valve 170 in accordance with the pump function. For example, the pump sensor 188 can sense the hydraulic pressure generated by the hydraulic pump 162 and, as a result, the electronic controller 180 may regulate, in a related and proportional relation, the electric current directed to the solenoid 172 of the pressure relief valve 170. Alternatively, the pump sensor 188 can directly or indirectly measure the pump speed of the hydraulic pump 162 and the electronic controller 180 can convert or extrapolate related information about the operation and characteristics of the hydraulic system 160.

Operation of the solenoid 172 of the pressure relief valve 170 as a proportional function of the operation of the hydraulic pump 162 is indicated in the pressure relief valve current curve 230 by the increasing electric current 232 that climbs from zero. The pressure relief valve 170 therefore changes between the high pressure state and the low pressure state in which the pressure relief valve blocks at least some of the pressurized hydraulic fluid from the hydraulic pump 162 from flowing to the transmission 126. The electronic controller 180 may implement a maximum limit on the electric current to the solenoid 172 as, for example, indicated by the maximum electric current 234 in the pressure relief valve current curve 230. Operating the solenoid 172 according to the pump function based on pump operation during lower hydraulic pump pressures and/or hydraulic pump speeds therefore reduces noise cause by energizing the solenoid 172

At a predetermined pump threshold time 236, the hydraulic pump 162 may be operating normally and the electric powertrain 122 may be fully operation and transmitting torque there through. Accordingly, the electronic controller 180 can stop regulating operation of the pressure relief valve 170 according to the pump function and may regulate the pressure relief valve according to a different function. For example, the electronic controller 180 can regulate electric current to the pressure relief valve 170 according to a current independence function in which the electric current is not related or proportional to the operation of the hydraulic pump 162. In an embodiment, this can be indicated by the constant electric current 238 in the pressure relief valve current curve 230.

INDUSTRIAL APPLICABILITY

Figure 4:
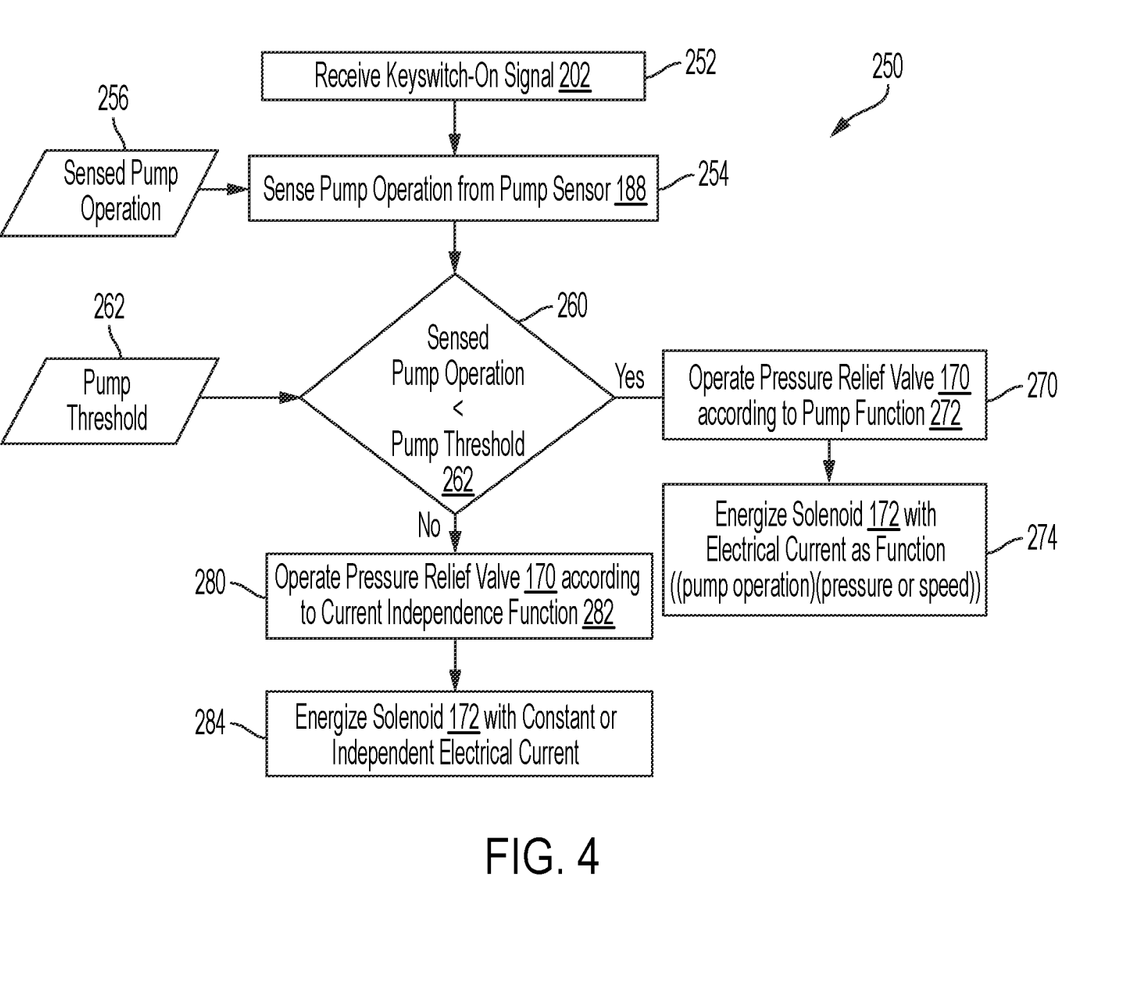
FIG. 4 is a flow diagram of a method of regulating electrical operation of the electrical pressure relief valve associated with the hydraulic system at startup.

Referring to FIG. 4, with continued reference to the previous figures, there is illustrated an embodiment of a process or method 250 of regulating operation of an electric powertrain 122 during startup conditions to reduce noise generated by an electrical pressure relief valve 170 operatively associated with a hydraulic system 160 of the electric powertrain. The method or process illustrated in FIG. 4 can be embodied as a computer readable program written as software in a suitable computer programming language and can be executed by the electronic controller 180 associated with the machine 100, such as the wheel loader shown in FIG. 1. In an initial keyswitch-on step 252, the electronic controller 180 can register a keyswitch on signal 202 from an operator to initiate operation of the electric powertrain 122. The keyswitch-on step 252 can be initiated by an operator at startup of the electric powertrain 122.

In a pump operation sensing step 254, the electronic controller 180 can sense operation of the hydraulic pump 162 via the pump sensor 188. By way of example, the sensed pump operation 256 sensed by the pump sensor 188 can be the hydraulic fluid pressure being generated by the hydraulic pump 162 associated with the hydraulic system 160 or the sensed pump operation 256 may be a pump speed measured directly from the hydraulic pump 162 or indirectly via the pump motor 166.

In a determination step 260, the electronic controller 180 can receive a predetermined pump threshold 262 that is associated with operation of hydraulic pump 162. For example, the pump threshold 262 can be fluid pressure or pump speed indicating that the hydraulic pump 162 is not functionally or significantly directing pressurized hydraulic fluid to the transmission 126. Accordingly, the pressure relief valve 170 can remain in a de-energized state as there is no significant risk of over-pressurizing the transmission 126 or of pressure spikes in the hydraulic system 160. In the determination step 260, the electronic controller 180 compares the sensed pump operation 256 with the pump threshold 262.

If the sensed pump operation is below the pump threshold 262, the electronic controller 180 may, in a first pressure relief valve operation step 270, operate the pressure relief valve 170 in accordance with a pump function 272. According to the pump function 272, operation of the pressure relief valve 170 occurs in a related or proportional relation to the sensed pump operation 256. For example, in a first energization step 274, the electronic controller 180 regulates the electric current directed to the solenoid 172 of the pressure relief valve 170 in proportional relation to the sensed pump operation 256, for example, according to the function:

Electric Current=Function(Pump Operation (pressure or speed))

When the solenoid 172 is energized in accordance with the pump function 272, noise generated by the solenoid will be reduced while the sensed pump operation 256 indicates low pump pressures or pump speed.

If the sensed pump operation 256 is above the pump threshold 262, indicating that the hydraulic pump 162 and/or the electric powertrain 122 are fully operational, the electronic controller 180 may, in a second pressure relief valve operation step 280, regulate operation of the pressure relief valve 170 in accordance with a different function. For example, the electronic controller 180 can be programmed with a current independence function 282 in which the electric current is independent or unrelated to the sensed pump operation 256. In a second energization 284, the electronic controller 180 directs electric current to the solenoid 172 in quantities that is independent of the sensed pump operation 256. For example, the electronic controller 180 can direct a constant electric current, independent of the sensed pump operation 256, to the solenoid 172, although in other embodiments the electric current may vary in accordance with other controls and considerations. The solenoid 172 is fully energized and can actuate the pressure relief valve 170 between the low pressure state and the high pressure state accordingly to control the flow of pressurized hydraulic fluid between the hydraulic pump 162 and the transmission 126, including the hydraulic gearshift actuators 156 and associated clutches 150 therein.

The disclosure thus regulate operation of an electric powertrain 122 during startup to reduce noises that may be generated by an electric pressure relief valve disposed in a hydraulic system 160 that directs pressurized hydraulic fluid to and from an transmission 126 and/or other components of the electric powertrain.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A machine comprising
an electrical power source;
an electric powertrain configured for electrical power, the electric powertrain including an electrical motor in electrical communication with the electrical power source for converting electrical power to rotational motion, the electric powertrain further including a transmission having a transmission input operatively coupled to the electrical motor and a transmission output operatively coupled to a point of utilization, the transmission further including a plurality of engageable gears and one or more hydraulic gearshift actuators for selectively engaging the plurality of engageable gears;
a hydraulic system for directing hydraulic fluid to and from the one or more hydraulic gearshift actuators, the hydraulic system including a fluid reservoir accommodating hydraulic fluid, a hydraulic pump for pressuring and directing hydraulic fluid from the fluid reservoir to the one or more hydraulic gearshift actuators, and a pressure relief valve disposed between the hydraulic pump and the one or more hydraulic gearshift actuators;
a pump sensor operatively associated with the hydraulic pump to sense a sensed pump operation; and an electronic controller operatively associated with the pressure relief valve and the pump sensor, the electronic controller programmed to regulate the pressure relief valve according to a pump function that relates electric current directed to the pressure relief valve when the sensed pump operation is below a pump threshold.

2. The machine of claim 1, wherein the pump function is proportional to the sensed pump operation.

3. The machine of claim 2, wherein the electronic controller is further programmed to regulate the pressure relief valve according to a current independence function that is independent of the sensed pump operation when the sensed pump operation exceeds the pump threshold.

4. The machine of claim 3, wherein the sensed pump operation is one of a pump hydraulic pressure and a pump speed.

5. The machine of claim 1, wherein the pressure relief valve includes a solenoid operatively configured to change the pressure relief valve between a high pressure state and a low pressure state.

6. The machine of claim 5, wherein the pressure relief valve is configured in the high pressure state when the solenoid is de-energized.

7. The machine of claim 6, wherein the pressure relief valve is configured in the low pressure state when the solenoid is energized.

8. The machine of claim 1, wherein the electronic controller regulates the pressure relief valve according to the pump function during startup of the electric powertrain.

9. The machine of claim 1, wherein the machine is a mobile machine and the point of utilization is a propulsion device of the mobile machine.

10. The machine of claim 9, wherein the mobile machine is a wheel loader.

11. The machine of claim 1, wherein the electrical power source is selected from the group comprising a battery, a fuel cell, and an electric generator.

12. A method of operating an electric powertrain having a transmission and configured to utilize electrical power, the method comprising:
receiving a keyswitch-on signal to initiate operation of the electric powertrain;
sensing a sensed pump operation of a hydraulic pump in fluid communication with the transmission;
regulating electric current directed to a pressure relief valve disposed between the hydraulic pump and the transmission according to a pump function if the sensed pump operation is below a pump threshold, wherein electric current is related to the sensed pump operation; and
regulating electric current directed to the pressure relief valve according to a current independence function if the sensed pump operation exceeds the pump threshold wherein the electric current is independent of the sensed pump operation.

13. The method of claim 12, where in the pump function is proportional to the sensed pump operation.

14. The method of claim 13, wherein the sensed pump operation is one of a pump hydraulic pressure and a pump speed.

15. The method of claim 12, wherein the pressure relief valve includes a solenoid operatively configured to change the pressure relief valve between a low pressure state and a high pressure stated.

16. The method of claim 15, wherein the pressure relief valve is in the high pressure state when the solenoid is de-energized.

17. The method of claim 12, wherein the transmission includes one or more hydraulic gearshift actuators operatively configured to selectively engage and disengage a plurality of engageable gears.

18. An electric powertrain comprising:
an electrical power source;
an electrical in electrical communication with the electrical power source for converting electrical power to rotational motion;
a transmission having a transmission input operatively coupled to the electrical motor and a transmission output operatively coupled to a point of utilization, the transmission further including a plurality of engageable gears and one or more hydraulic gearshift actuators for selectively engaging and disengaging the plurality of engageable gears;
a hydraulic system for directing hydraulic fluid to and from the one or more hydraulic gearshift actuators, the hydraulic system including a fluid reservoir accommodating hydraulic fluid, a hydraulic pump for pressuring and directing hydraulic fluid from the fluid reservoir to the one or more hydraulic gearshift actuators, and a pressure relief valve disposed between the hydraulic pump and the one or more hydraulic gearshift actuators;
a pump sensor operatively associated with the hydraulic pump to sense a sensed pump operation; and
an electronic controller operatively associated with the pressure relief valve and the pump sensor, the electronic controller programmed to regulate the pressure relief valve according to a pump function that proportionally relates electric current directed to the pressure relief valve with the sensed pump operation.

19. The electric powertrain of claim 18, wherein the sensed pump operation is one of a pump hydraulic pressure and a pump speed.

20. The electric powertrain of claim 19, where the electronic controller is further programmed to compare the sensed pump operation with a pump threshold and to regulate pressure relief valve according to a current independence function that is independent of the sensed pump operation when the sensed pump operation exceeds the pump threshold.

* * * * *